US009324321B2

(12) United States Patent
Xue et al.

(10) Patent No.: US 9,324,321 B2
(45) Date of Patent: Apr. 26, 2016

(54) LOW-FOOTPRINT ADAPTATION AND PERSONALIZATION FOR A DEEP NEURAL NETWORK

(71) Applicant: Microsoft Technology Licensing, LLC, Redmond, WA (US)

(72) Inventors: Jian Xue, Sammamish, WA (US); Jinyu Li, Redmond, WA (US); Dong Yu, Bothell, WA (US); Michael L. Seltzer, Seattle, WA (US); Yifan Gong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/201,704

(22) Filed: Mar. 7, 2014

(65) Prior Publication Data

US 2015/0255061 A1 Sep. 10, 2015

(51) Int. Cl.
*G10L 15/16* (2006.01)
*G10L 15/07* (2013.01)

(52) U.S. Cl.
CPC ............... *G10L 15/16* (2013.01); *G10L 15/075* (2013.01)

(58) Field of Classification Search
CPC ....... G10L 15/16; G10L 15/063; G10L 15/07; G10L 15/1815; G10L 15/20; G06N 3/084; G06N 3/0454; G06N 3/0481
USPC .......................................................... 704/232
See application file for complete search history.

(56) References Cited

U.S. PATENT DOCUMENTS

| 6,167,377 | A  | 12/2000 | Gillick et al. |
| 6,185,528 | B1 | 2/2001  | Fissore et al. |
| 6,263,308 | B1 | 7/2001  | Heckerman |
| 6,970,947 | B2 | 11/2005 | Ebling et al. |
| 7,835,910 | B1 | 11/2010 | Hakkani-Tur et al. |

(Continued)

FOREIGN PATENT DOCUMENTS

| EP | 0553101 B1 | 7/1997 |
| EP | 2575128 A2 | 4/2013 |

(Continued)

OTHER PUBLICATIONS

U.S. Appl. No. 14/265,110, filed Apr. 29, 2014, entitled "Shared Hidden Layer Combination for Speech Recognition Systems".

(Continued)

*Primary Examiner* — Charlotte M Baker
(74) *Attorney, Agent, or Firm* — Tom Wong; Steven Spellman; Micky Minhas

(57) ABSTRACT

The adaptation and personalization of a deep neural network (DNN) model for automatic speech recognition is provided. An utterance which includes speech features for one or more speakers may be received in ASR tasks such as voice search or short message dictation. A decomposition approach may then be applied to an original matrix in the DNN model. In response to applying the decomposition approach, the original matrix may be converted into multiple new matrices which are smaller than the original matrix. A square matrix may then be added to the new matrices. Speaker-specific parameters may then be stored in the square matrix. The DNN model may then be adapted by updating the square matrix. This process may be applied to all of a number of original matrices in the DNN model. The adapted DNN model may include a reduced number of parameters than those received in the original DNN model.

20 Claims, 8 Drawing Sheets

(56) References Cited

U.S. PATENT DOCUMENTS

| | | | |
|---|---|---|---|
| 8,015,006 | B2 | 9/2011 | Kennewick et al. |
| 8,229,729 | B2 | 7/2012 | Sarikaya et al. |
| 8,275,615 | B2 | 9/2012 | Kozat |
| 8,296,107 | B2 | 10/2012 | Turner et al. |
| 8,321,220 | B1 | 11/2012 | Chotimongkol et al. |
| 8,326,634 | B2 | 12/2012 | Di Cristo et al. |
| 8,346,563 | B1 | 1/2013 | Hjelm et al. |
| 8,400,332 | B2 | 3/2013 | Szwabowski et al. |
| 8,412,521 | B2 | 4/2013 | Mathias et al. |
| 8,571,866 | B2 | 10/2013 | Melamed et al. |
| 2002/0083041 | A1 | 6/2002 | Achlioptas |
| 2003/0125948 | A1 | 7/2003 | Lyudovyk |
| 2004/0088726 | A1 | 5/2004 | Ma et al. |
| 2005/0065789 | A1 | 3/2005 | Yacoub |
| 2007/0038436 | A1 | 2/2007 | Cristo et al. |
| 2007/0156392 | A1 | 7/2007 | Balchandran et al. |
| 2007/0203863 | A1 | 8/2007 | Gupta |
| 2007/0226649 | A1 | 9/2007 | Agmon |
| 2008/0004877 | A1 | 1/2008 | Tian |
| 2008/0235017 | A1 | 9/2008 | Satomura |
| 2009/0030697 | A1 | 1/2009 | Cerra et al. |
| 2009/0292687 | A1 | 11/2009 | Fan |
| 2010/0004930 | A1 | 1/2010 | Strope |
| 2010/0128863 | A1 | 5/2010 | Krum et al. |
| 2010/0211695 | A1 | 8/2010 | Steinmetz et al. |
| 2010/0312546 | A1 | 12/2010 | Chang et al. |
| 2011/0010171 | A1 | 1/2011 | Talwar et al. |
| 2011/0093459 | A1 | 4/2011 | Dong et al. |
| 2011/0144999 | A1 | 6/2011 | Jang et al. |
| 2011/0153324 | A1 | 6/2011 | Ballinger et al. |
| 2012/0065976 | A1 | 3/2012 | Deng |
| 2012/0084086 | A1 | 4/2012 | Gilbert |
| 2012/0232885 | A1 | 9/2012 | Barbosa et al. |
| 2012/0253802 | A1 | 10/2012 | Heck et al. |
| 2012/0254086 | A1 | 10/2012 | Deng |
| 2012/0254227 | A1 | 10/2012 | Heck et al. |
| 2012/0265531 | A1 | 10/2012 | Bennett |
| 2012/0271617 | A1 | 10/2012 | Nakajima et al. |
| 2012/0290293 | A1 | 11/2012 | Hakkani-Tur et al. |
| 2012/0303565 | A1 | 11/2012 | Deng et al. |
| 2013/0031476 | A1 | 1/2013 | Coin et al. |
| 2013/0085756 | A1 | 4/2013 | Chotimongkol et al. |
| 2013/0138436 | A1 | 5/2013 | Yu |
| 2013/0152092 | A1 | 6/2013 | Yadgar |
| 2013/0185065 | A1 | 7/2013 | Tzirkel-Hancock et al. |
| 2014/0025380 | A1 | 1/2014 | Koch et al. |
| 2014/0257803 | A1* | 9/2014 | Yu et al. .................. 704/232 |
| 2014/0358537 | A1 | 12/2014 | Gilbert |
| 2014/0372112 | A1 | 12/2014 | Xue et al. |
| 2014/0379326 | A1 | 12/2014 | Sarikaya et al. |
| 2014/0379353 | A1 | 12/2014 | Boies et al. |
| 2015/0100312 | A1 | 4/2015 | Bocchieri |
| 2015/0161993 | A1 | 6/2015 | Sainath |
| 2015/0161994 | A1 | 6/2015 | Tang |
| 2015/0255069 | A1 | 9/2015 | Adams |
| 2015/0278191 | A1 | 10/2015 | Levit et al. |
| 2015/0310858 | A1 | 10/2015 | Li et al. |
| 2015/0325236 | A1 | 11/2015 | Levit et al. |

FOREIGN PATENT DOCUMENTS

| | | | |
|---|---|---|---|
| JP | 2002091477 A | | 3/2002 |
| KR | 20130022513 | | 3/2013 |
| WO | WO 2005/013262 A1 | | 2/2005 |
| WO | 2013/171481 A2 | | 11/2013 |

OTHER PUBLICATIONS

U.S. Appl. No. 14/273,100, filed May 8, 2014, entitled "Context Specific Language Model Scale Factors".

Gruenstein, et al., "Context-Sensitive Language Modeling for Large Sets of Proper Nouns in Multimodal Dialogue Systems", In Proceedings of IEEE/ACL Workshop on Spoken Language Technology, Dec. 10, 2006, 4 pages.

Heck et al.; "Robustness to Telephone Handset Distortion in Speaker Recognition by Discriminative Feature Design"; In Journal of Speech Communication—Speaker Recognition and its Commercial and Forensic Applications, vol. 31, Issue 2-3; Jun. 2000; http://rmcet.com/lib/E-Journals/Speech%20Communication/1-s2.0-S0167638399000771-main.pdf; 12 pgs.

Konig et al., "Nonlinear Discriminant Feature Extraction for Robust Text-Independent Speaker Recognition"; In Proceeding of the RLA2C, ESCA workshop on Speaker Recognition and its Commercial and Forensic Applications; Apr. 1998; http://www.msr-waypoint.com/pubs/193653/konig_heck/DNN.pdf; 4 pgs.

Lecouteux et al., "Dimensionality Reduction for Speech Recognition Using Neighborhood Components Analysis"; In Proceedings of 8th Annual Conference of the International Speech Communication Association, Antwerp; Dec. 27, 2007; http://www.cs.columbia.edu/~mcollins/papers/icslp07.pdf; 4 pgs.

Lecouteux et al., "Dynamic Combination of Automatic Speech Recognition Systems by Driven Decoding"; In Journal of IEEE Transactions on Audio, Speech and Language Processing; Jan. 2013; http://hal.archives-ouvertes.fr/docs/00/75/86/26/PDF/SystemCombination.pdf; 10 pgs.

Li et al., "Lattice Combination for Improved Speech Recognition", In Proceedings of the 7th International Conference of Spoken Language Processing; Sep. 16, 2002; http://www.cs.cmu.edu/afs/cs/user/robust/www/Papers/icslp02_xiang.pdf; 4 pgs.

Liu, et al., "Use of Contexts in Language Model Interpolation and Adaptation", In Journal of Computer Speech and Language vol. 27 Issue 1, Feb. 2009, 23 pages.

Meinedo et al., "Combination of Acoustic Models in Continuous Speech Recognition Hybrid Systems"; In Proceedings of Sixth International Conference on Spoken Language Processing: Oct. 2000: http://www.inesc-id.pt/pt/indicadores/Ficheiros/416.pdf; 4 pgs.

Motlicek et al., "Feature and Score Level Combination of Subspace Gaussinasin LVCSR Task"; In IEEE International Conference on Acoustics, Speech and Signal Processing; May 26, 2013; http://ieeexplore.ieee.org/stamp/stamp.jsp?tp=&arnumber=6639142: 5 pgs.

Saluja, et al., "Context-aware Langauage Modeling for Conversational Speech Translation", In Proceedings of Machine Translation Summit XIII, Sep. 19, 2011, 8 pages.

Su et al., "Error Back Propagation for Sequence Training of Context-Dependent Deep Networks for Conversational Speech Transcription"; In IEEE International Conference on Acoustics, Speech, and Signal Processing; May 26, 2013: http://research.microsoft.com/pubs/194345/0006664.pdf; 5 pgs.

Swietojanski et al., "Revisiting Hybrid and GMM-HMM System Combination Techniques"; In Proceeding of the IEEE International Conference on Acoustics, Speech and Signal Processing; May 26, 2013; http://homepages.inf.ed.ac.uk/s1136550/data/Swietojanski_ICASSP2013.pdf; 5 pgs.

Yan et al., "A Scalable Approach to Using DSS-Derived Features in GMM-HMM Based Acoustic Modeling for LVCSR"; In Proceeding of the 14th Annual Conference of the International Speech Communication Assoctation; Aug. 25, 2013; http://homepages.inf.ed.ac.uk/s1136550/data/Swietojanski_ICASSP2013.pdf; 5 pgs.

Yu, et al., "Roles of Pre-Training and Fine-Tuning is Context-Dependent DBN-HMMs for Real-Word Speech Recognition", In Proceeding of NIPS Workshop on Deep Learning and Unsupervised Feature Learning, Dec. 2010, 8 pages.

Davis, et al., "Low-Rank Approximations for Conditional Feedforward Computation in Deep Neural Networks", In Proceedings of ArXiv preprint arXiv:1312.4461, Dec. 2013, 9 pages.

Chen, Wei, "Building Language Model on Continuous Space using Gaussian Mixture Models", In Proceedings of Research in Language Modeling, Jan. 2007, 66 pages.

Novak, et al., "Use of Non-Negative Matrix Factorization for Language Model Adaptation in a Lecture Transcription Task", In Proceedings of IEEE International Conference on Acoustics, Speech, and Signal Processing, vol. 1, May 7, 2001, 4 pages.

Barman, et al., "Nonnegative Matrix Factorization (NMF) Based Supervised Feature Selection and Adaptation", In Proceedings of the 9th International Conference on Intelligent Data Engineering and Automated Learning, Nov. 2, 2008, 2 pages.

(56) References Cited

OTHER PUBLICATIONS

Trmal, et al., "Adaptation of a Feedforward Artificial Neural Network Using a Linear Transform", In Proceedings of in Text, Speech and Dialogue, Sep. 10, 2010, pp. 8.

Liao, Hank, "Speaker Adaptation of Context Dependent Deep Neural Networks", In IEEE International Conference on Acoustics, Speech and Signal Processing, May 26, 2013, 5 pages.

Dahl, et al., "Context-Dependent Pre-Trained Deep Neural Networks for Large Vocabulary Speech Recognition", In IEEE Transactions on Audio, Speech, and Language Processing, vol. 20, Issue 1, Jan. 1, 2012, 13 pages.

Jaitly, et al., "An Application of Pretrained Deep Neural Networks to Large Vocabulary Conversational Speech Recognition", In Proceedings of 13th Annual Conference of the International Speech Communication Association, Mar. 12, 2012, 11 pages.

Sainath, et al., "Making Deep Belief Networks Effective for Large Vocabulary Continuous Speech Recognition", In Proceedings of IEEE Workshop on Automatic Speech Recognition and Understanding, Dec. 11, 2011, 6 pages.

Dahl, et al., "Large Vocabulary Continuous Speech Recognition with Context-Dependent DBN-HMMs", In IEEE International Conference on Acoustics, Speech and Signal Processing, May 22, 2011, 4 pages.

Mohamed, et al., "Acoustic Modeling Using Deep Belief Networks", In IEEE Transactions on Audio, Speech, and Language Processing, vol. 20, Issue 1, Jan. 2012, 10 pages.

Yu, et al., "Improved Bottleneck Features Using Pretrained Deep Neural Networks", In Proceedings of 12th Annual Conference of the International Speech Communication Association, Aug. 28, 2011, 4 pages.

Sainath, et al., "Auto-Encoder Bottleneck Features Using Deep Belief Networks", In Proceedings of IEEE International Conference on Acoustics, Speech and Signal Processing, Mar. 25, 2012, 4 pages.

Yao, et al., "Adaptation of Context-Dependent Deep Neural Networks for Automatic Speech Recognition", In IEEE Spoken Language Technology Workshop, Dec. 2, 2012, 4 pages.

Li, et al., "Comparison of Discriminative Input and Output Transformations for Speaker Adaptation in the Hybrid NN/HMM Systems", In Proceedings of 11th Annual Conference of the International Speech Communication Association, Sep. 26, 2010, 4 pages.

Gemello, et al., "Adaptation of Hybrid ANN/HMM Models Using Linear Hidden Transformations and Conservative Training", In IEEE International Conference on Acoustics, Speech and Signal Processing, May 14, 2006, 4 pages.

Siniscalchi, et al., "Hermitian Based Hidden Activation Functions for Adaptation of Hybrid HMM/ANN Models", In Proceedings of 13th Annual Conference of the International Speech Communication Association, Sep. 9, 2012, 4 pages.

Yu, et al., "KL-Divergence Regularized Deep Neural Network Adaptation for Improved Large Vocabulary Speech Recognition", In IEEE International Conference on Acoustics, Speech and Signal Processing, May 26, 2013, 5 pages.

Abdel-Hamid, et al., "Fast Speaker Adaptation of Hybrid NN/HMM Model for Speech Recognition Based on Discriminative Learning of Speaker Code", In IEEE International Conference on Acoustics, Speech and Signal Processing, May 26, 2013, 5 pages.

Sainath, et al., "Low-Rank Matrix Factorization for Deep Neural Network Training with High-Dimensional Output Targets", In proceedings of IEEE International Conference on Acoustics, Speech and Signal Processing, May 26, 2013, 5 pages.

Xue, et al., "Restructuring of Deep Neural Network Acoustic Models with Singular Value Decomposition", In Proceedings of 14th Annual Conference of the International Speech Communication Association, Aug. 25, 2013, 5 pages.

U.S. Appl. No. 13/920,323, "Restructuring Deep Neural Network Acoustic Models", Filed Date: Jun. 18, 2013.

Abid, et al., "A New Neural Network Pruning Method Based on the Singular Value Decomposition and the Weight Initialisation", In Proceedings of 11th European Signal Processing Conference, Sep. 3, 2002, 4 pages.

Abad, et al., "Context Dependent Modelling Approaches for Hybrid Speech Recognizers", In Proceeding of Interspeech, Sep. 26, 2010, 4 pages.

Hinton, et al., "Deep Neural Networks for Acoustic Modeling in Speech Recognition", In IEEE Signal Processing Magazine, vol. 29, Issue 6, Nov. 2012, 27 pages.

Deng, et al., "Roles of Pre-Training and Fine-Tuning in Context-Dependent DBN-HMMs for Real-Word Speech Recognition", In Proceeding of NIPS Workshop on Deep Learning and Unsupervised Feature Learning, Dec. 2010, 8 pages.

Seide, et al., "Conversational Speech Transcription using Context-Dependent Deep Neural Networks", In Proceeding of 12th Annual Conference of the International Speech Communication Association, Aug. 28, 2011, 4 pages.

Yu, et al., "Exploiting Sparseness in Deep Neural Networks for Large Vocabulary Speech Recognition", In Proceeding of IEEE International Conference on Acoustics, Speech and Signal Processing, Mar. 25, 2012, 4 pages.

Vanhoucke, et al., "Improving the Speed of Neural Networks on CPUs", In Proceedings of NIPS Workshop on Deep Learning and Unsupervised Feature Learning, Dec. 16, 2011, 8 pages.

International Search Report and Written Opinion Issued in PCT Application No. PCT/US2014/041014, Mailed Date: Oct. 2, 2014, 9 Pages.

International Search Report and Written Opinion Issued in PCT Application No. PCT/US2014/041023, Mailed Date: Jun. 3, 2015, 17 Pages.

International Search Report and Written Opinion Issued in PCT Application No. PCT/US2015/017872, Mailed Date: Jun. 25, 2015, 11 Pages.

International Search Report and Written Opinion Issued in PCT Application No. PCT/US2015/029334, Mailed Date: Jul. 7, 2015, 12 Pages.

Bohus, et al., "Olympus: An Open-Source Framework for Conversational Spoken Language Interface Research", In Proceedings of the Workshop on Bridging the Gap: Academic and Industrial Research in Dialog Technologies, Apr. 2007, 8 pages.

Chandrasekaran et al., "Sparse and Low-Rank Matrix Decompositions"; IFAC Symposium on System Identification, 2009; 6 pgs.

Dos Reis Mota, Pedro Jose, "LUP: A Language Understanding Platform", A Dissertation for the Degree of Master of Information Systems and Computer Engineering, Jul. 2012, 128 pages.

Eagle, et al., "Common Sense Conversations: Understanding Casual Conversation using a Common Sense Database", In Proceedings of the Artificial Intelligence, Information Access, and Mobile Computing Workshop, Aug. 2003, 6 pages.

He et al; "What is Discriminative Learning"; Achorn International; Jun. 25, 2008; 25 pgs.

Hoffmeister et al., "Log-Linear Model Combination with Word-Dependent Scaling Factors"; Human Language Technology and Pattern Recognition Computer Science Department; Sep. 6-10; Brighton UK; Copyright © 2009 ISCA; 4 pgs.

Huang et al., "Unified Stochastic Engine (USE) for Speech Recognition"; School of Computer Science; 1993 IEEE; 4 pgs.

"Integrated Development Environments for Natural Language Processing", Published on: Oct. 2001, Available at: http://www.textanalysis.com/TAI-IDE-WP.pdf; 13 pgs.

Keshtkar et al., "A Corpus-based Method for Extracting Paraphrases of Emotion Terms"; Proceedings of the NAACL HLT 2010 Workshop on Computational Appraoches to Analysis and Generation of Emotion in Text; Jun. 2010; 10 pgs.

Ko, et al., "Cammia—A Context-Aware Spoken Dialog System for Mobile Environments", In Automatic Speech Recognition and Understanding Workshop, Jul. 29, 2011, 2 pages.

Lee, et al., "Intention-Based Corrective Feedback Generationusing Context-Aware Model", In Proceedings of the Second International Conference on Computer Supported Education, Apr. 7, 2010, 8 pages.

Moreira et al., "Towards the Rapid Development of a Natural Language Understanding Module", In Proceedings of the 10th International Conference on Intelligent Virtual Agenqts, Jan. 2011, 7 pages.

(56) References Cited

OTHER PUBLICATIONS

Sarukkai, et al., "Improved Spontaneous Dialogue Recognition Using Dialogue and Utterance Triggers by Adaptive Probability Boosting", In Fourth International Conference on Spoken Language, vol. 1, Oct. 3, 1996, 4 pages.
Sarukkai et al., "Word Set Probability Boosting for Improved Spontaneous Dialog Recognition"; IEEE Transactions on Speech and Audio Processing, vol. 5, No. 5, Sep. 1997; 13 pgs.
Seneff, et al., "Galaxy-II: A Reference Architecture for Conversational System Development", In Proceedings of the 5th International Conference on Spoken Language Processing, Nov. 2008, 4 pages.
Sing, et al., "Domain Metric Knowledge Model for Embodied Conversation Agents", In 5th International Conference on Research, Innovation & Vision for the Future, Mar. 5, 2007, 7 pages.
Xue, et al., "Singular Value Decomposition Based Low-Footprint Speaker Adaptation and Personalization for Deep Neural Network", In Proceedings of the IEEE International Conference on Acoustics, Speech and Signal Processing, May 4, 2014, pp. 6359-6363.
U.S. Official Action dated May 6, 2015 in U.S. Appl. No. 13/923,969, 12 pgs.
Response dated May 21, 2015 in U.S. Appl. No. 13/920,323, 15 pgs.
U.S. Official Action dated May 28, 2015 in U.S. Appl. No. 13/923,917, 18 pgs.
Response dated Aug. 6, 2015 in U.S. Appl. No. 13/923,969, 7 pgs.
Response dated Aug. 7, 2015 in U.S. Appl. No. 13/923,917, 10 pgs.
U.S. Official Action dated Sep. 24, 2015 in U.S. Appl. No. 13/920,323, 25 pgs.
U.S. Appl. No. 14/227,492, filed Mar. 27, 2014, entitled "Flexible Schema for Language Model Customization".
Liu, et al., "Language Model Combination and Adaptation using Weighted Finite State Transducers", In Proceedings of IEEE International Conference on Acoustics Speech and Signal Processing, Mar. 14, 2010, 4 pages.
Preliminary Report on Patentability dated Sep. 15, 2015 in Appln No. PCT/US2014/041014, 6 pgs.
U.S. Official Action dated Aug. 13, 2015 in U.S. Appl. No. 14/227,492, 41 pgs.
U.S. Official Action dated Sep. 29, 2015 in U.S. Appl. No. 13/923,917, 9 pgs.
U.S. Official Action dated Oct. 1, 2015 in U.S. Appl. No. 13/920,323, 34 pgs.
Notice of Allowance dated Oct. 1, 2015 in U.S. Appl. No. 13/923,969, 7 pgs.
Notice of Allowance dated Nov. 30, 2015 in U.S. Appl. No. 13/923,969, 12 pgs.
Lilly, et al., "Robust Speech Recognition Using Singular Value Decomposition Based Speech Enhancement," IEEE Tencon, 1997, 4 pgs.
U.S. Official Action dated Feb. 27, 2015 in U.S. Appl. No. 13/920,323, 22 pgs.
Preliminary Report on Patentability dated Nov. 13, 2015 in Appln No. PCT/US2014/041023, 7 pgs.
Preliminary Report on Patentability dated Dec. 14, 2015 in Appln No. PCT/US2015/017872, 7 pgs.
Notice of Allowance dated Dec. 15, 2015 in U.S. Appl. No. 13/923,917, 11 pgs.
U.S. Official Action dated Jan. 4, 2016 in U.S. Appl. No. 13/920,323, 49 pgs.
U.S. Official Action dated Mar. 3, 2016 in U.S. Appl. No. 13/920,323, 24 pgs.
Notice of Allowance dated Mar. 4, 2016 in U.S. Appl. No. 13/923,917, 28 pgs.
PCT Written Opinion dated Feb. 11, 2016 in Appln No. PCT/US2015/021921, 7 pgs.

* cited by examiner

LOW-FOOTPRINT ADAPTATION AND PERSONALIZATION FOR A DEEP NEURAL NETWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Many computing devices, such as smartphones, desktops, laptops, tablets, game consoles, and the like, utilize automatic speech recognition (ASR) for performing a number of tasks including voice search and short message dictation. In an effort to improve the accuracy of ASR, the use of deep neural networks (DNNs) has been proposed. DNNs are artificial neural networks with more than one hidden layer between input and output layers and may model complex non-linear relationships. The hidden layers in DNNs provide additional levels of abstraction, thus increasing its modeling capability. DNNs when utilized in ASR however, suffer from a number of drawbacks associated with adaption and personalization. For example, the use of DNNs, while increasing ASR accuracy, also is accompanied by a very large number of parameters making the adaptation of DNN models very challenging. Furthermore, the cost associated with using DNNs in personalized ASR applications (i.e., multiple individual speakers) is prohibitive due to the need to store very large DNN models for each individual speaker during deployment. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide for the adaptation and personalization of a deep neural network (DNN) model for automatic speech recognition. Utterances which include speech features for many speakers are used to train the DNN model. A decomposition approach such as low-rank factorization may then be applied to an original weight matrix in the DNN model. As a result of applying the decomposition approach, the original weight matrix may be converted into multiplications of multiple new matrices which are smaller than the original matrix. A square matrix may then be added to these matrices. Speaker-specific parameters may then be stored in the square matrix which is initialized as an identity matrix. The DNN model may then be adapted by updating the square matrix. The adapted DNN model may include a reduced number of model parameters than those received in the original DNN model. This process may be applied to all of a number of original matrices in the DNN model.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments provide for the adaptation and personalization of a deep neural network (DNN) model for automatic speech recognition. Utterances which include speech features for many speakers are used to train the DNN model. A decomposition approach such as low-rank factorization may then be applied to an original weight matrix in the DNN model. As a result of applying the decomposition approach, the original weight matrix may be converted into multiplications of multiple new matrices which are smaller than the original matrix. A square matrix may then be added to these matrices. The speaker-specific parameters may then be stored in the square matrix which is initialized as the identity matrix. The DNN model may then be adapted by updating the square matrix. This process may be applied to all of a number of original matrices in the DNN model. The adapted DNN model may include a reduced number of model parameters than those received in the original DNN model.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
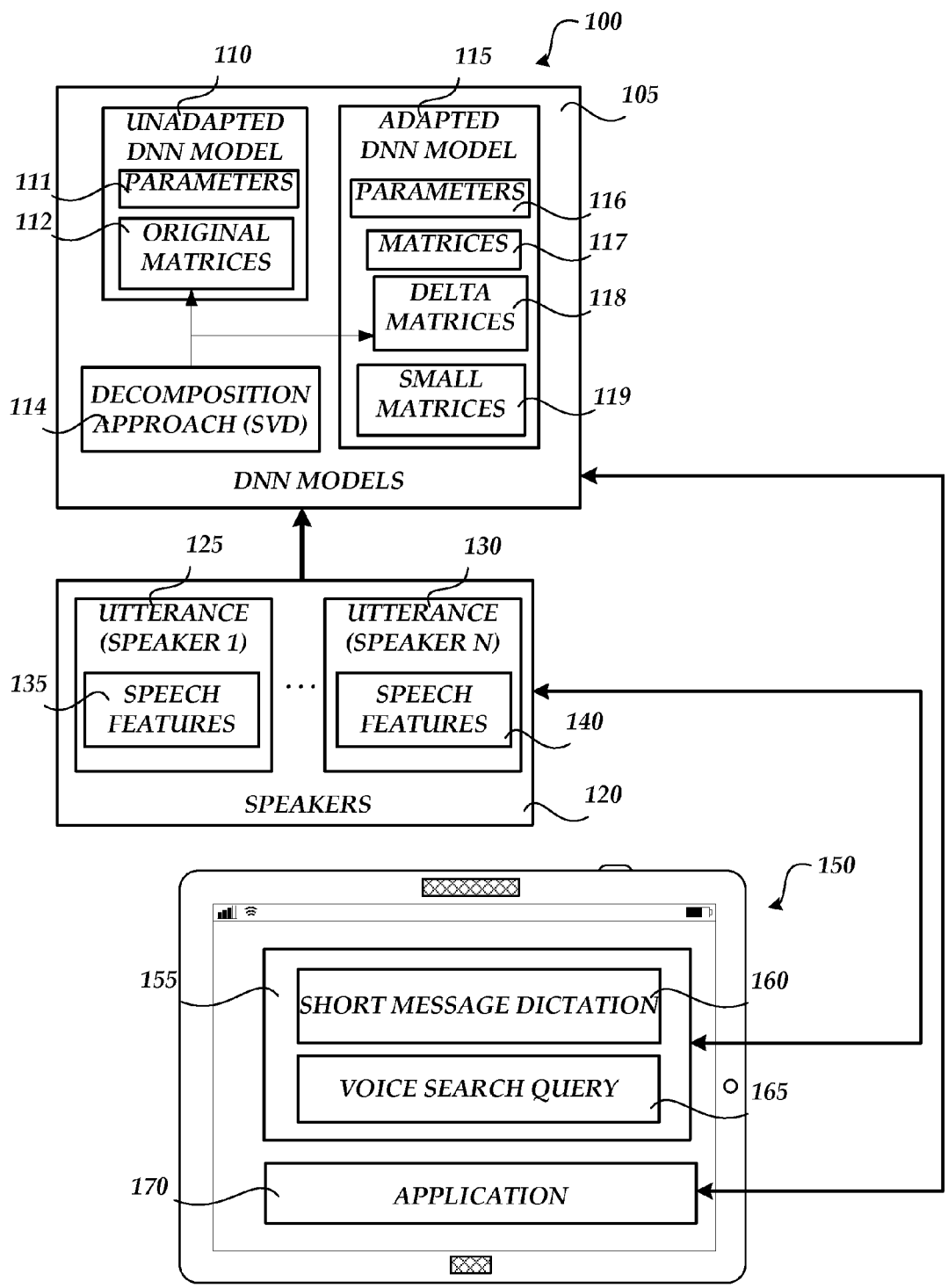
FIG. 1 is a block diagram illustrating a system for adapting and personalizing a deep neural network model for automatic speech recognition, in accordance with an embodiment.

Referring now to the drawings, in which like numerals represent like elements through the several figures, various aspects of the present invention will be described. FIG. 1 is a block diagram illustrating a system 100 which may be utilized for adapting and personalizing a deep neural network model for automatic speech recognition, in accordance with an embodiment. The system 100, which may comprise a conversational dialog system, includes a computing device 150 which may receive utterances 125 and 130 from one or more speakers 120 (e.g., Speakers 1 through N). The utterances 125 and 130 received by the computing device 150 may comprise a short message dictation 160 and/or a voice search query 165 which may be displayed to a user in user interface 155. The utterances 125 and 130 may include speech features 135 and 140 which may be received from one or more ASR tasks such as the short message dictation 155 and/or a voice search query 165.

In accordance with various embodiments, the computing device 150 may comprise, without limitation, a desktop computer, laptop computer, smartphone, video game console or a television. The computing device 150 may also comprise or be in communication with one or more recording devices (not shown) used to detect speech and receive video/pictures (e.g., MICROSOFT KINECT, microphone(s), and the like). The computing device 150 may store an application 170 which, as will be described in greater detail below, may be configured to receive the speech features 135 and 140 contained in the utterances 125 and 130.

As will further be described in greater detail below, the application 170 may also be configured to generate deep neural network (DNN) models 105 for use in automatic speech recognition. In accordance with embodiments described herein, the DNN models 105 may include one or more unadapted DNN models 110, each of which includes parameters 111 (i.e., model parameters) and one or more adapted DNN models 115, each of which may include parameters 116 (i.e., speaker-specific model parameters). As will be described in greater detail below with respect to FIGS. 2-4, a decomposition approach 114 (hereinafter referred to as SVD 114) may be applied to original matrices 112 in the unadapted DNN model 110 for adaptation such that the number of parameters 116 in the adapted DNN model 115 is reduced when compared to the number of parameters 111 in the unadapted DNN model 110. The adapted DNN model 115 may include matrices 117. The matrices 117 may comprise additional matrices converted from the original matrices 112 in the unadapted DNN model, as a result of the applied SVD 114, during adaptation operations performed by the application 170 which are described in detail below with respect to FIG. 3. Furthermore, as a result of adaptation operations performed by the application 170 which are described in detail below with respect to FIG. 4, the adapted DNN model 115 may also include delta matrices 118 and small matrices 119. In accordance with an embodiment, the application 130 may comprise the BING VOICE SEARCH, WINDOWS PHONE SHORT MESSAGE DICTATION and XBOX MARKET PLACE VOICE SEARCH applications from MICROSOFT CORPORATION of Redmond Wash. It should be understood, however, that other applications (including operating systems) from other manufacturers may alternatively be utilized in accordance with the various embodiments described herein.

Figure 2:
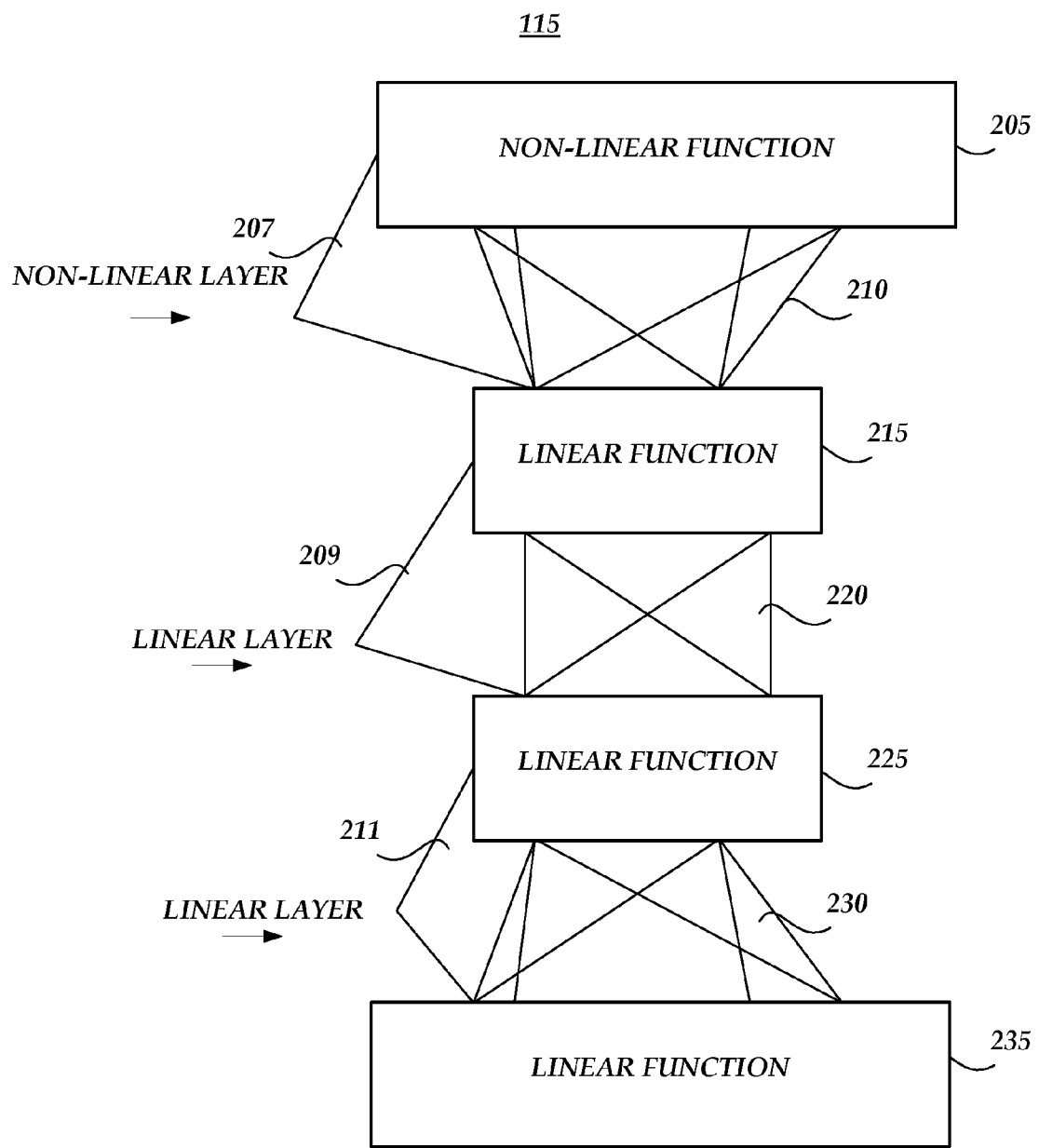
FIG. 2 is a block diagram illustrating the adaptation of a deep neural network model, in accordance with an embodiment.

FIG. 2 is a block diagram illustrating the adaptation of a DNN model, in accordance with an embodiment. The adapted DNN model 115 may include layers 207, 209 and 211. The layer 207, which may comprise a non-linear function 205 and a matrix 210, is a non-linear layer while the layers 209 and 211 (which may comprise linear functions 214 and 225 as well as matrices 220 and 230, respectively) are linear layers. The adapted DNN model 115 may also comprise an additional linear function 235. As will be described in greater detail below with respect to FIG. 3, the matrix 220 may comprise a square or identity matrix which is the only matrix updated during adaption and which contains a smaller number of parameters than the unadapted (i.e., original) DNN model 110.

Figure 3:
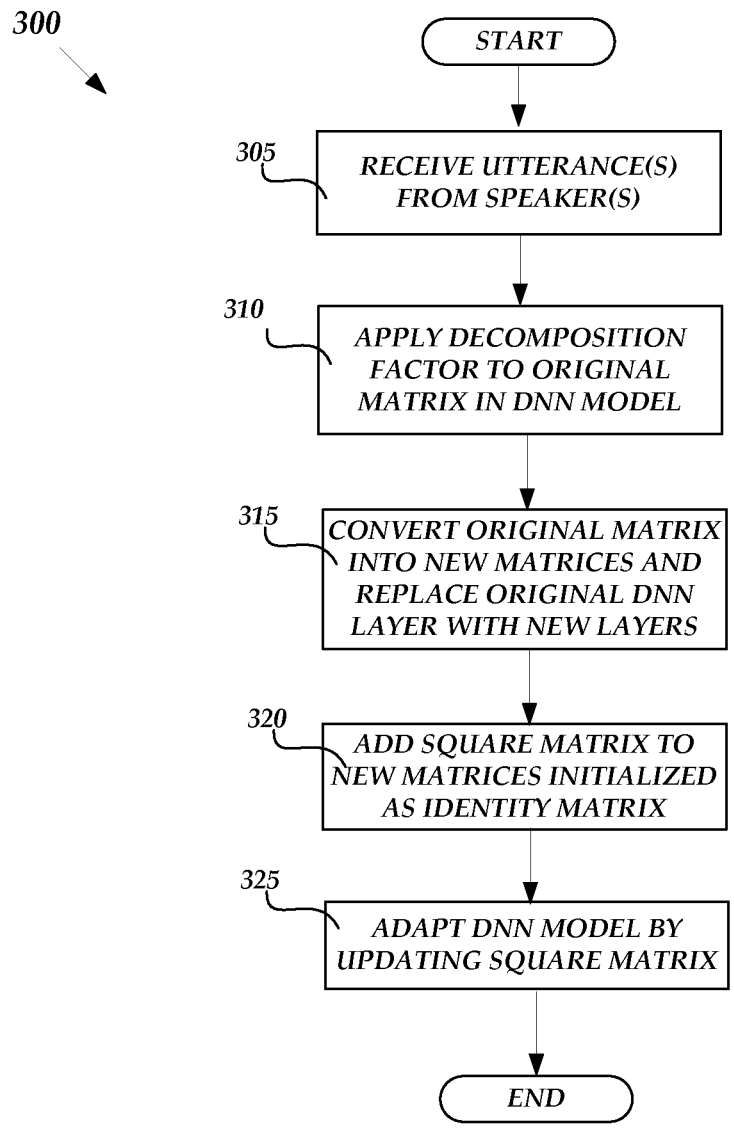
FIG. 3 is a flow diagram illustrating a routine for adapting and personalizing a deep neural network model for automatic speech recognition, in accordance with an embodiment.

FIG. 3 is a flow diagram illustrating a routine 300 for adapting and personalizing a deep neural network model for automatic speech recognition, in accordance with an embodiment. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 3-4 and making up the various embodiments described herein are referred to variously as operations, structural devices, acts or modules. It will be recognized by one skilled in the art that these operations, structural devices, acts and modules may be implemented in software, in hardware, in firmware, in special purpose digital logic, and any combination thereof without deviating from the spirit and scope of the present invention as recited within the claims set forth herein.

The routine 300 begins at operation 305, where the application 170 executing on the computing device 150 may receive one or more of the utterances 125, 130 including the speech features 135, 140, from the speakers 120. For example, the utterances 125, 130 may comprise short message dictation 160 and/or voice search query 165.

From operation 305, the routine 300 continues to operation 310, where the application 170 executing on the computing device 150 may apply the SVD 114 to an original matrix (i.e., the one or more of the original matrices 112) in the unadapted DNN model 110.

From operation 310, the routine 300 continues to operation 315, where the application 170 executing on the computing device 150 may convert the original matrix (i.e., the original matrices 112) into new matrices (i.e., the matrices 117) and replace an original layer with new layers (i.e., the layers 207, 209 and 211).

In accordance with an embodiment, the original matrix may comprise an m×n weight matrix A in the unadapted DNN model 110 and the operations 305 and 310 may be mathematically represented as follows when the SVD 114 has been applied:

$$A_{m \times n} = U_{m \times n} \Sigma_{n \times n} V_{n \times n}^T$$

where Σ may be a diagonal matrix with A's singular values on the diagonal. In accordance with an embodiment, if A is a sparse matrix, then the number of A's non-zero singular values may be much smaller than n, which may be represented by the variable k. In this case, the aforementioned expression may be rewritten as follows:

$$A_{m \times n} = U_{m \times k} \Sigma_{k \times k} V_{k \times n}^T = U_{m \times k} N_{k \times n}$$

where U and N represent the new matrices 117. It should be understood that the new matrices 117 may be smaller than any of the original matrices 112. For example, the new matrices 117 may be smaller in one or more dimensions or be lower ranked than the original matrices 112.

From operation 315, the routine 300 continues to operation 320, where the application 170 executing on the computing device 150 may add a square matrix (i.e., the matrix 220) to the new matrices 117. As discussed above, the square matrix may comprise an identity matrix I. The aforementioned operation may be mathematically represented as follows:

$$A_{m \times n} = U_{m \times k} N_{k \times n} = U_{m \times k} I_{k \times k} N_{k \times n}$$

It should be understood that as a result of the operations 305-315, the matrix A is converted into three matrices U, N and I and, correspondingly an original layer in the unadapted DNN model 110 is replaced with three layers (i.e., the layers 207, 209 and 211) with two of the layers being linear layers and the other layer being non-linear.

From operation 320, the routine 300 continues to operation 325, where the application 170 executing on the computing device 150 may adapt the unadapted DNN model 110 by updating the square matrix 220 to generate the adapted DNN model 115. In particular, the application 170 may only update the identity matrix I in the formula discussed above with respect to operation 320. It should be understood that the number of parameters for the identity matrix I may be k^2 which represent a much smaller number of parameters than those originally received by the unadapted (i.e., original) DNN model 110 when k is small (as discussed above). It should be further understood that the adapted DNN model 115 represents a reduction in the overall number of speech parameters received by the original unadapted DNN model 110. Moreover, it should be appreciated that the routine 300 may be applied to all of the original matrices 112 in the unadapted DNN model 110 such that multiple square matrices are applied for adaptation. From operation 325, the routine 300 then ends.

Figure 4:
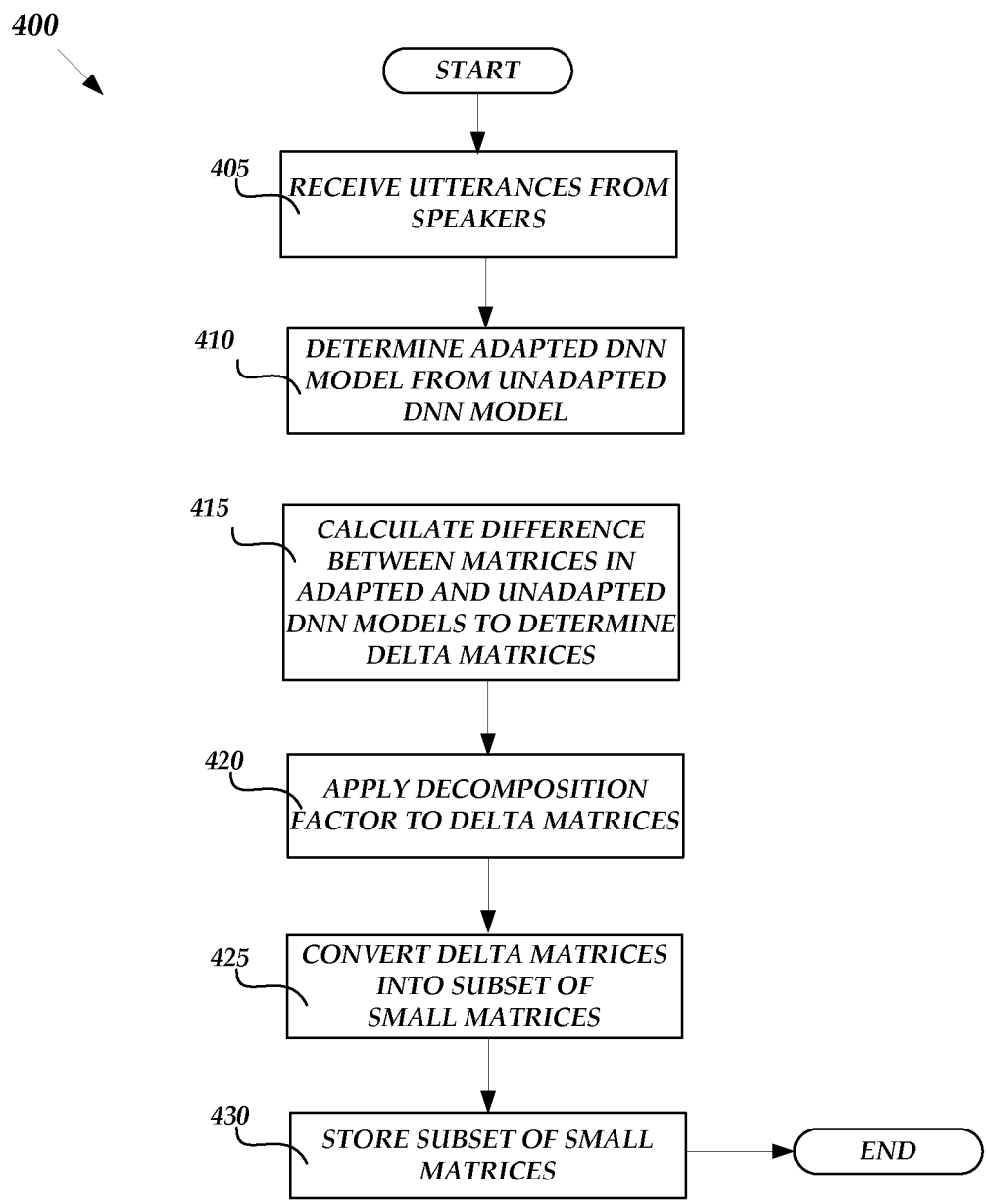
FIG. 4 is a flow diagram illustrating a routine for adapting and personalizing a deep neural network model for automatic speech recognition, in accordance with another embodiment.

FIG. 4 is a flow diagram illustrating a routine 400 for adapting and personalizing a deep neural network model for automatic speech recognition, in accordance with an embodiment. The routine 400 begins at operation 405, where the application 170 executing on the computing device 150 may receive one or more of the utterances 125, 130 including the speech features 135, 140, from the speakers 120. For example, the utterances 125, 130 may comprise short message dictation 160 and/or voice search query 165.

From operation 405, the routine 400 continues to operation 410, where the application 170 executing on the computing device 150 may apply determine the adapted DNN model 115 from the unadapted DNN model 110 as described above with respect to operations 305-325 of FIG. 3.

From operation 410, the routine 400 continues to operation 415, where the application 170 executing on the computing device 150 may calculate the difference between the matrices in the adapted DNN model 115 and unadapted DNN model 110 to determine the delta matrices 118. As should be understood by those skilled in the art, in some embodiments, the adapted DNN model may have the same format and structure as the unadapted DNN model 110 which may be very large. As a result, the storing of large DNN models for individual speakers during model deployment (i.e., personalization) may be very costly. Delta matrices however, comprise sparse matrices and have a very low rank. Thus, the small matrices 119 converted from the delta matrices 118 have a low footprint and enable the personalization of smaller and less costly DNN models for use in automatic speech recognition.

From operation 415, the routine 400 continues to operation 420, where the application 170 executing on the computing device 150 may apply the SVD 114 to each of the calculated delta matrices 118 while only maintaining a small amount of non-zero singular values for each delta matrix. As a result, after the application of the SVD 114, the delta matrices 118 may be largely unchanged.

From operation 420, the routine 400 continues to operation 425, where the application 170 executing on the computing device 150 may convert the delta matrices 118 into a subset of small matrices 119. In particular, each delta matrix 118 may be converted into the product of two low-rank matrices. In accordance with an embodiment, the operations 415-425 may be mathematically represented as follows:

$$D_{mxn} = A_{mxn}^{adapted} - A_{mxn}^{unadapted} = U_{mxn} \Sigma_{nxn} V_{nxn}^T$$

$$= U_{mxk} \Sigma_{kxk} V_{kxn}^T = U_{mxk} N_{kxn}$$

From operation 425, the routine 400 continues to operation 430, where the application 170 executing on the computing device 150 may store the subset of small matrices 119. In particular, the application 170 may only store the matrices U and N (from the above mathematical expression) for each individual speaker. It should be understood that, in accordance with an embodiment, the total number of parameters in the above mathematical expression may change from mn to (m+n)k. From operation 430, the routine 400 then ends.

In accordance with some embodiments, the routines 300 and 400 discussed above with respect to FIGS. 3 and 4 may be combined. For example, the routine 300 may be utilized to perform SVD adaptation such that the difference between the adapted DNN model and the unadapted DNN model are square matrices between each of a pair of linear layers. SVD may further be applied on delta matrices to save DNN model costs even further.

Figure 5:
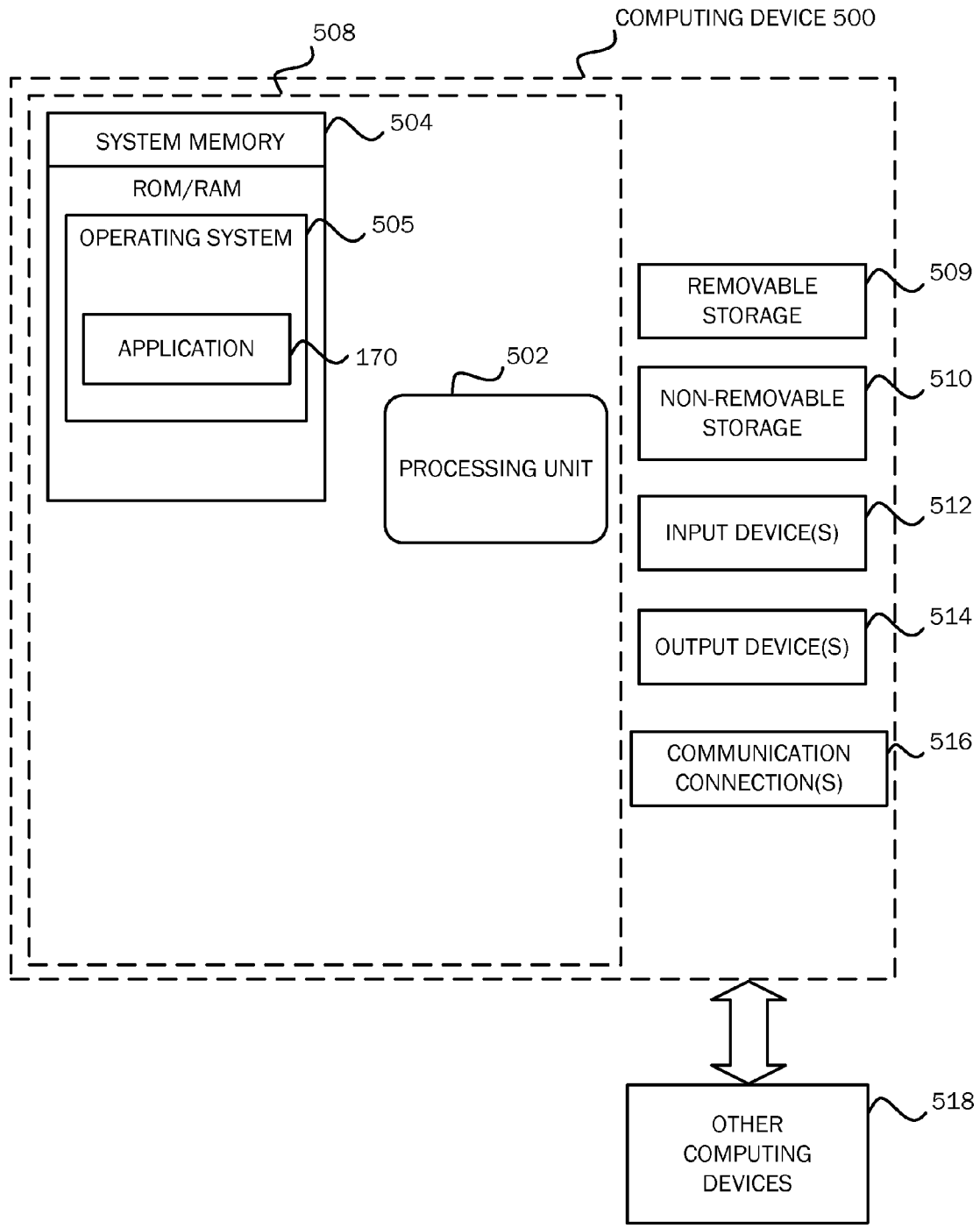
FIG. 5 is a simplified block diagram of a computing device with which various embodiments may be practiced.
Figure 6A:
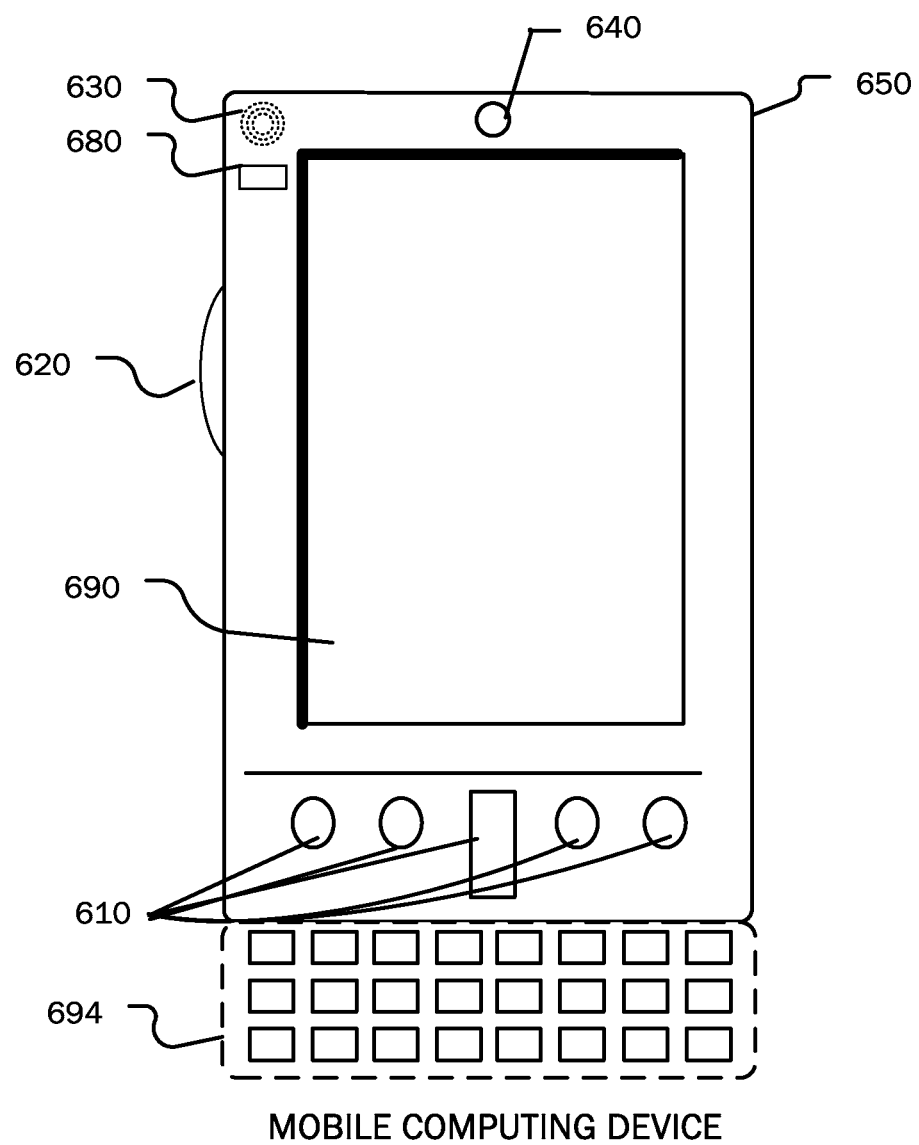
FIG. 6A is a simplified block diagram of a mobile computing device with which various embodiments may be practiced.
Figure 6B:
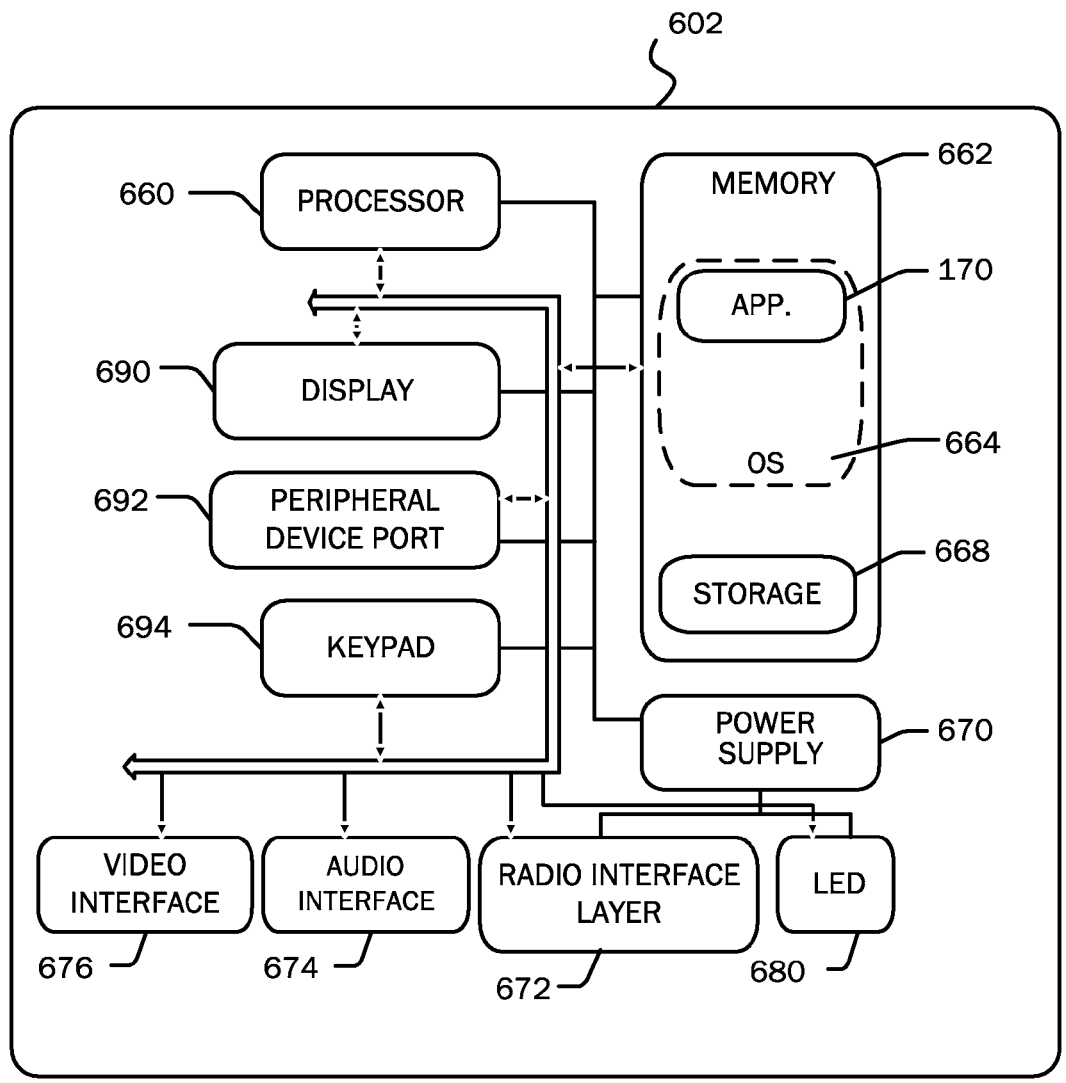
FIG. 6B is a simplified block diagram of a mobile computing device with which various embodiments may be practiced.
Figure 7:
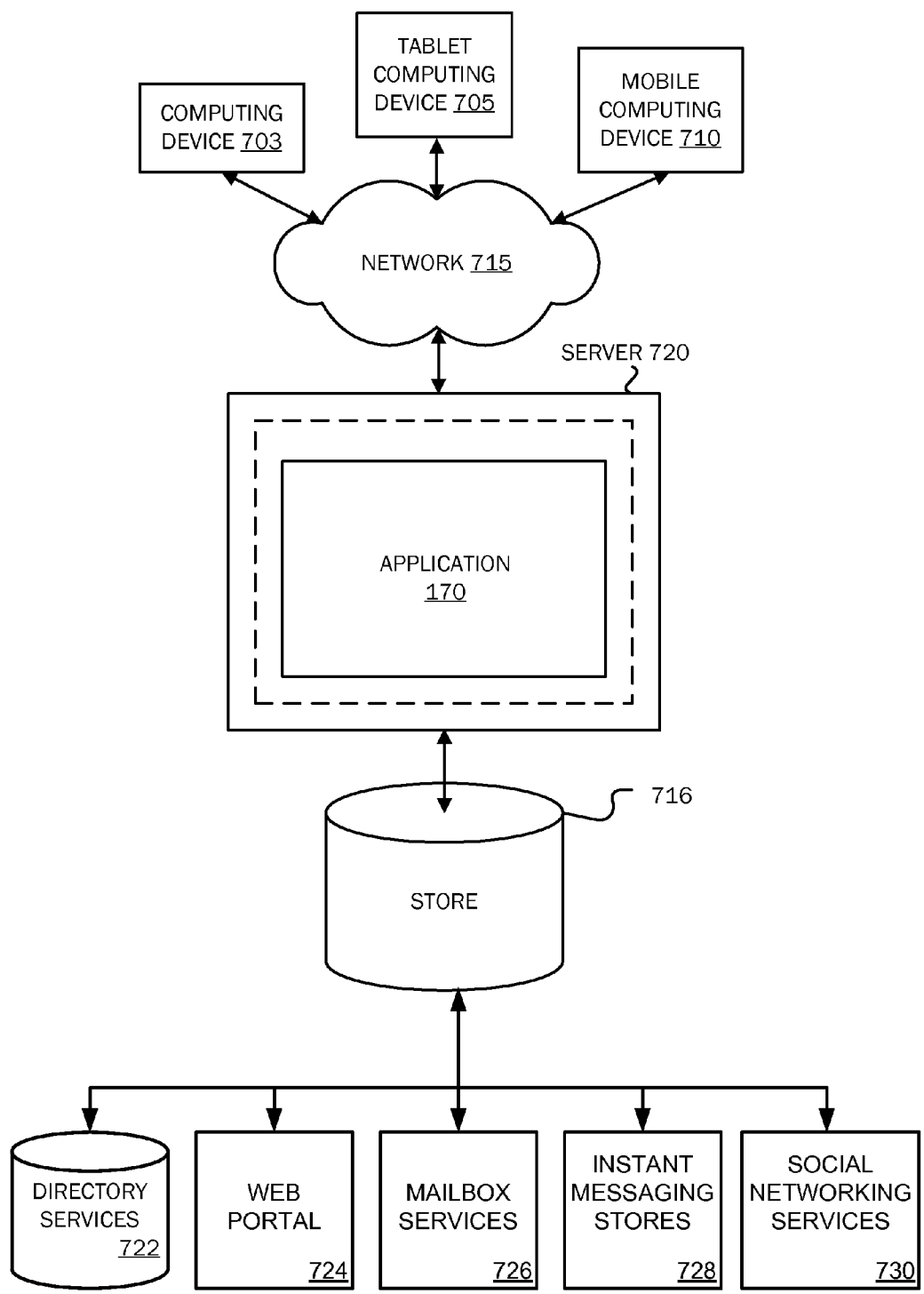
FIG. 7 is a simplified block diagram of a distributed computing system in which various embodiments may be practiced.

FIG. 5-7 and the associated descriptions provide a discussion of a variety of operating environments in which embodiments of the invention may be practiced. However, the devices and systems illustrated and discussed with respect to FIGS. 5-7 are for purposes of example and illustration and are not limiting of a vast number of computing device configurations that may be utilized for practicing embodiments of the invention, described herein.

FIG. 5 is a block diagram illustrating example physical components of a computing device 500 with which various embodiments may be practiced. In a basic configuration, the computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include an operating system 505 and application 170. Operating system 505, for example, may be suitable for controlling the computing device 500's operation and, in accordance with an embodiment, may comprise the WINDOWS operating systems from MICROSOFT CORPORATION of Redmond, Wash. The application 170 (which, in some embodiments, may be included in the operating system 505) may comprise functionality for performing routines including, for example, the adaptation and personalization of a deep neural network (DNN) model for automatic speech recognition, as described above with respect to the operations in routines 300-400 of FIGS. 3-4.

The computing device 500 may have additional features or functionality. For example, the computing device 500 may also include additional data storage devices (removable and/or non-removable) such as, for example, magnetic disks, optical disks, solid state storage devices ("SSD"), flash memory or tape. Such additional storage is illustrated in FIG. 5 by a removable storage 509 and a non-removable storage 510. The computing device 500 may also have input device(s) 512 such as a keyboard, a mouse, a pen, a sound input device (e.g., a microphone), a touch input device for receiving gestures, an accelerometer or rotational sensor, etc. Output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may operate via application-specific logic integrated with other components of the computing device/system 500 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a suitable mobile computing environment, for example, a mobile computing device 650 which may include, without limitation, a smartphone, a tablet personal computer, a laptop computer and the like, with which various embodiments may be practiced. With reference to FIG. 6A, an example mobile computing device 650 for implementing the embodiments is illustrated. In a basic configuration, mobile computing device 650 is a handheld computer having both input elements and output elements. Input elements may include touch screen display 625 and input buttons 610 that allow the user to enter information into mobile computing device 650. Mobile computing device 650 may also incorporate an optional side input element 620 allowing further user input. Optional side input element 620 may be a rotary switch, a button, or any other type of manual input element. In alternative embodiments, mobile computing device 650 may incorporate more or less input elements. In yet another alternative embodiment, the mobile computing device is a portable telephone system, such as a cellular phone having display 625 and input buttons 610. Mobile computing device 650 may also include an optional keypad 605. Optional keypad 605 may be a physical keypad or a "soft" keypad generated on the touch screen display.

Mobile computing device 650 incorporates output elements, such as display 625, which can display a graphical user interface (GUI). Other output elements include speaker 630 and LED 680. Additionally, mobile computing device 650 may incorporate a vibration module (not shown), which causes mobile computing device 650 to vibrate to notify the user of an event. In yet another embodiment, mobile computing device 650 may incorporate a headphone jack (not shown) for providing another means of providing output signals.

Although described herein in combination with mobile computing device 650, in alternative embodiments may be used in combination with any number of computer systems, such as in desktop environments, laptop or notebook computer systems, multiprocessor systems, micro-processor based or programmable consumer electronics, network PCs, mini computers, main frame computers and the like. Various embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate the various embodiments described herein.

FIG. 6B is a block diagram illustrating components of a mobile computing device used in one embodiment, such as the mobile computing device 650 shown in FIG. 6A. That is, mobile computing device 650 can incorporate a system 602 to implement some embodiments. For example, system 602 can be used in implementing a "smartphone" that can run one or more applications similar to those of a desktop or notebook computer. In some embodiments, the system 602 is integrated as a computing device, such as an integrated personal digital assistant (PDA) and wireless phone.

Application 170 may be loaded into memory 662 and run on or in association with an operating system 664. The system 602 also includes non-volatile storage 668 within memory the 662. Non-volatile storage 668 may be used to store persistent information that should not be lost if system 602 is powered down. The application 170 may use and store information in the non-volatile storage 668. The application 170, for example, may comprise functionality for performing routines including, for example, the adaptation and personalization of a deep neural network (DNN) model for automatic speech recognition, as described above with respect to the operations in routines 300-400 of FIGS. 3-4.

A synchronization application (not shown) also resides on system 602 and is programmed to interact with a corresponding synchronization application resident on a host computer to keep the information stored in the non-volatile storage 668 synchronized with corresponding information stored at the host computer. As should be appreciated, other applications may also be loaded into the memory 662 and run on the mobile computing device 650.

The system 602 has a power supply 670, which may be implemented as one or more batteries. The power supply 670 might further include an external power source, such as an AC adapter or a powered docking cradle that supplements or recharges the batteries.

The system 602 may also include a radio 672 (i.e., radio interface layer) that performs the function of transmitting and receiving radio frequency communications. The radio 672 facilitates wireless connectivity between the system 602 and the "outside world," via a communications carrier or service provider. Transmissions to and from the radio 672 are conducted under control of OS 664. In other words, communications received by the radio 672 may be disseminated to the application 170 via OS 664, and vice versa.

The radio 672 allows the system 602 to communicate with other computing devices, such as over a network. The radio 672 is one example of communication media. The embodiment of the system 602 is shown with two types of notification output devices: the LED 680 that can be used to provide visual notifications and an audio interface 674 that can be used with speaker 630 to provide audio notifications. These devices may be directly coupled to the power supply 670 so that when activated, they remain on for a duration dictated by the notification mechanism even though processor 660 and other components might shut down for conserving battery power. The LED 680 may be programmed to remain on indefinitely until the user takes action to indicate the powered-on status of the device. The audio interface 674 is used to provide audible signals to and receive audible signals from the user. For example, in addition to being coupled to speaker 630, the audio interface 674 may also be coupled to a microphone (not shown) to receive audible (e.g., voice) input, such as to facilitate a telephone conversation. In accordance with embodiments, the microphone may also serve as an audio sensor to facilitate control of notifications. The system 602 may further include a video interface 676 that enables an operation of on-board camera 640 to record still images, video streams, and the like.

A mobile computing device implementing the system 602 may have additional features or functionality. For example, the device may also include additional data storage devices (removable and/or non-removable) such as, magnetic disks, optical disks, or tape. Such additional storage is illustrated in FIG. 6B by storage 668.

Data/information generated or captured by the mobile computing device 650 and stored via the system 602 may be stored locally on the mobile computing device 650, as described above, or the data may be stored on any number of storage media that may be accessed by the device via the radio 672 or via a wired connection between the mobile computing device 650 and a separate computing device associated with the mobile computing device 650, for example, a server computer in a distributed computing network such as the Internet. As should be appreciated such data/information may be accessed via the mobile computing device 650 via the radio 672 or via a distributed computing network. Similarly, such data/information may be readily transferred between computing devices for storage and use according to well-known data/information transfer and storage means, including electronic mail and collaborative data/information sharing systems.

FIG. 7 is a simplified block diagram of a distributed computing system in which various embodiments may be practiced. The distributed computing system may include number of client devices such as a computing device 703, a tablet computing device 705 and a mobile computing device 710. The client devices 703, 705 and 710 may be in communication with a distributed computing network 715 (e.g., the Internet). A server 720 is in communication with the client devices 703, 705 and 710 over the network 715. The server 720 may store application 170 which may be perform routines including, for example, the adaptation and personalization of a deep neural network (DNN) model for automatic speech recognition, as described above with respect to the operations in routines 300-400 of FIGS. 3-4.

Content developed, interacted with, or edited in association with the application 170 may be stored in different communication channels or other storage types. For example, various documents may be stored using a directory service 722, a web portal 724, a mailbox service 726, an instant messaging store 728, or a social networking site 730.

The application 170 may use any of these types of systems or the like for enabling data utilization, as described herein. The server 720 may provide the proximity application 170 to clients. As one example, the server 720 may be a web server providing the application 170 over the web. The server 720 may provide the application 170 over the web to clients through the network 715. By way of example, the computing device 10 may be implemented as the computing device 703 and embodied in a personal computer, the tablet computing device 705 and/or the mobile computing device 710 (e.g., a smart phone). Any of these embodiments of the computing devices 703, 705 and 710 may obtain content from the store 716.

Various embodiments are described above with reference to block diagrams and/or operational illustrations of methods, systems, and computer program products. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method of adapting and personalizing a deep neural network (DNN) model for automatic speech recognition (ASR), comprising:

receiving, by a computing device, at least one utterance comprising a plurality of speech features for one or more speakers from one or more ASR tasks;

applying, by the computing device, a decomposition process to two or more matrices in the DNN model;

in response to applying the decomposition process, adapting the DNN model to include a decomposed matrix that is generated from decomposition processing of the two or more matrices; and exposing the adapted DNN model as a service.

2. The method of claim 1, wherein the adapting of the DNN model further comprises replacing the two or more matrices in a layer of the DNN model with the decomposed matrix.

3. The method of claim 1, wherein the adapting of the DNN model further comprises adding a new layer into the DNN model, wherein the new layer comprises the decomposed matrix a non-linear layer.

4. The method of claim 1, wherein applying, by the computing device, the decomposition process further comprises applying singular value decomposition (SVD) to the two or more matrices in the DNN model.

5. The method of claim 1, wherein the decomposition process further comprises applying affine transformations to inputs and outputs of the DNN model.

6. The method of claim 1, wherein the exposing further comprises at least one selected from a group consisting of: providing the adapted DNN model as a web service and incorporating the adapted DNN model in an application that is distributed to a client device.

7. A system for adapting and personalizing a deep neural network (DNN) model for automatic speech recognition (ASR), comprising:

a memory for storing executable program code; and a processor, functionally coupled to the memory, the processor being responsive to computer-executable instructions contained in the program code and operative to:

receive at least one utterance comprising a plurality of speech features for one or more speakers from one or more ASR tasks;

determine an adapted DNN model from the DNN model, the DNN model comprising a plurality of unadapted matrices and the adapted DNN model comprising a plurality of adapted matrices;

calculate a difference between the plurality adapted matrices and the plurality of unadapted matrices to determine a plurality of delta matrices;

apply a decomposition process to the plurality of delta matrices;

convert the plurality of delta matrices into a subset of one or more small matrices; and store the subset of the one or more small matrices within an adapted DNN model as a speaker dependent feature set.

8. The system of claim 7, wherein the processor, in applying the decomposition process to the plurality of delta matrices, is operative to apply singular value decomposition (SVD) to each of the plurality of delta matrices.

9. The system of claim 7, wherein the processor, in converting each of the plurality of delta matrices into a subset of the one or more small matrices, is operative to convert the product of two low-rank matrices.

10. The system of claim 7, wherein the processor, in storing the subset of the one or more small matrices, the subset of the one or more small matrices comprising a small percentage of a plurality of parameters in the DNN model, is operative to only store the subset of the one or more small matrices for each of one or more speakers.

11. The system of claim 7, further comprising at least one selected from a group consisting of: providing the adapted DNN model as a web service and incorporating the adapted DNN model in an application that is distributed to a client device.

12. The system of claim 7, further comprising receiving a spoken utterance, and analyzing the spoken utterance using the adapted DNN model.

13. A computer-readable storage medium storing computer executable instructions which, when executed by a computer, will cause computer to perform a method of adapting and personalizing a deep neural network (DNN) model for automatic speech recognition (ASR), the method comprising:

receiving a plurality of utterances, each of the plurality of utterances comprising a plurality of speech features for a plurality of speakers from one or more ASR tasks;

applying a decomposition process to two or more matrices in the DNN model; and in response to applying the decomposition process, adapting the DNN model to include a decomposed matrix that is generated from decomposition processing of the two or more matrices.

14. The computer-readable storage medium of claim 13, wherein the adapting of the DNN model further comprises updating a layer of the DNN model to include the decomposed matrix.

15. The computer-readable storage medium of claim 14, wherein the adapting of the DNN model further comprises adding at least one new layer into the DNN model, wherein the new layer comprises the decomposed matrix a non-linear layer.

16. The computer-readable storage medium of claim 15, wherein the at least one of new layer is a linear layer, the linear layer comprising a linear function.

17. The computer-readable storage medium of claim 13, wherein applying the decomposition process further comprises applying singular value decomposition (SVD) to the two or more matrices in the DNN model.

18. The computer-readable storage medium of claim 13, wherein the applying of the decomposition process further comprises applying affine transformations to inputs and outputs of the DNN model.

19. The computer-readable storage medium of claim 13, wherein the method further comprising: using the adapted DNN model as a web service.

20. The computer-readable storage medium of claim 13, wherein the method further comprising: incorporating the adapted DNN model as component in an application service.

* * * * *